United States Patent
Zheng

(10) Patent No.: US 11,691,728 B2
(45) Date of Patent: Jul. 4, 2023

(54) SECURITY CAMERA COVERAGE TEST

(71) Applicant: Alarm.com Incorporated, Tysons, VA (US)

(72) Inventor: Yang Yang Zheng, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 138 days.

(21) Appl. No.: 17/228,056

(22) Filed: Apr. 12, 2021

(65) Prior Publication Data

US 2021/0319244 A1 Oct. 14, 2021

Related U.S. Application Data

(60) Provisional application No. 63/009,559, filed on Apr. 14, 2020.

(51) Int. Cl.
*G06V 20/10* (2022.01)
*B64C 39/02* (2023.01)
*G06F 16/587* (2019.01)
*G06T 7/73* (2017.01)
*B64U 101/30* (2023.01)

(52) U.S. Cl.
CPC .......... *B64C 39/024* (2013.01); *G06F 16/587* (2019.01); *G06T 7/73* (2017.01); *G06V 20/10* (2022.01); *B64U 2101/30* (2023.01)

(58) Field of Classification Search
CPC .... G06V 10/255; G06V 20/10; B64C 39/024; B64C 2201/123; B64C 2201/127; B64C 2201/12; G06F 16/587; G06T 7/73; H04N 7/181
See application file for complete search history.

(56) References Cited

U.S. PATENT DOCUMENTS

| 2014/0192193 | A1 | 7/2014 | Zufferey et al. | |
| 2015/0116487 | A1* | 4/2015 | Ptitsyn | G11B 27/28 348/143 |
| 2017/0217589 | A1* | 8/2017 | Maekawa | B64C 39/024 |
| 2018/0349678 | A1* | 12/2018 | Koskan | G06Q 10/00 |

FOREIGN PATENT DOCUMENTS

| CN | 110268224 A | * | 9/2019 | ........... G01C 21/005 |
| JP | 2020023283 A | * | 2/2020 | |

* cited by examiner

*Primary Examiner* — Matthew C Bella
*Assistant Examiner* — Kathleen M Broughton
(74) *Attorney, Agent, or Firm* — Fish & Richardson P.C.

(57) ABSTRACT

A security system can perform a systematic test to generate a visualization of the security camera coverage for an area. The test can be performed using a network of security cameras, a central system, and a mapping entity. The mapping entity may hold or be attached to a sign with a pattern. The mapping entity can move the sign from one location to another throughout a zone to be mapped. At each location, the mapping entity may send a message with the coordinate of its current position and optionally the pattern it is carrying to the central system.

11 Claims, 6 Drawing Sheets

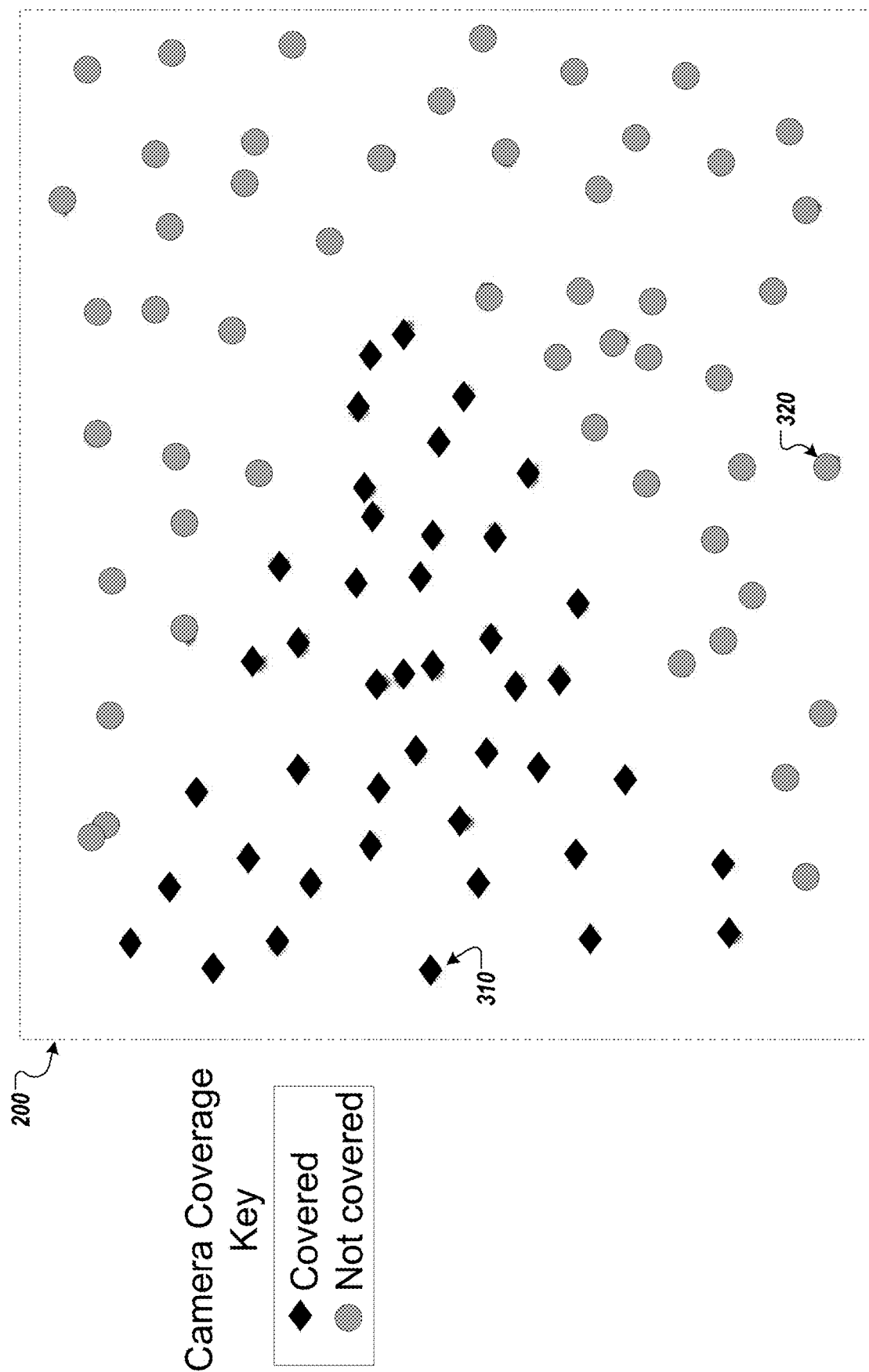

SECURITY CAMERA COVERAGE TEST

CROSS-REFERENCE TO RELATED APPLICATION

This application claims the benefit of U.S. Provisional Patent Application No. 63/009,559, filed Apr. 14, 2020, which is incorporated herein by reference in its entirety.

TECHNICAL FIELD

This specification generally relates to security systems.

BACKGROUND

Cameras are often used to provide visual information regarding an area such as commercial and residential buildings, schools, or play grounds. Often times a network of cameras may be used to provide more coverage of the area. However, there may be gaps in security in areas that are not covered by cameras.

SUMMARY

It is often difficult to determine the areas of a premise that are not covered by security cameras based on visual data, e.g., video footage, obtained from the security cameras. Areas with no coverage are often referred to as "blind spots." While attempts can be made to guess which areas are blind spots based on the footage obtained from a security camera, such attempts are generally insufficient and susceptible to error. In larger areas with a more extensive network of security cameras, determining blind spots may be even more complex and susceptible to human error.

According to an innovative aspect of the subject matter described in this specification, a security system may execute a systematic test that can generate a visualization of the security camera coverage for an area. The test can be performed using a network of security cameras, a central system, and a mapping entity. The mapping entity may hold or be attached to a sign with a pattern. The mapping entity can move the sign from one location to another throughout a zone to be mapped. At each location, the mapping entity may send a message with the coordinate of its current position and optionally the pattern it is carrying to the central system.

The central system may transmit a request to all the security cameras in the mapping zone querying whether or not the camera currently detects the pattern associated with the mapping entity. Each of the security cameras may respond to the query with information indicating whether or not the camera has detected the pattern. After the system obtained the results from the cameras, the mapping entity may move to the next location. This process can be repeated until all desired locations within the mapping zone have been covered by the mapping entity. After completing the testing or based on receiving real time data, the responses from the cameras may be utilized to generate a graphical representation or visualization of camera coverage in an area. This visualization can be used to determine any blind spots in camera coverage.

In some implementations, a procedure similar to the one described above can be executed when the position or orientation of a pattern is modified (in addition to its location). In this manner, the test does not only provide information regarding whether a pattern can be detected by a security network cameras, but the test can also provide information as to which cameras can detect a pattern based on the angle that a sign or pattern is positioned at a location.

According to some aspects, a computer-implemented method includes a portable mapping device receiving coordinate data indicative of a geographical location of the portable mapping device. A physical sign is attached to the portable mapping device. The computer-implemented method also includes identifying a camera configured to obtain images in a geographical area that includes the geographical location, transmitting a query message to the camera to query whether the camera has obtained an image that includes the physical sign, and receiving, from the camera, a first query response message including data indicating whether the camera has obtained an image that includes the physical sign. A camera coverage map is generated that indicates locations within the geographical location that the camera provides camera coverage for. The camera coverage map is generated based on the data indicating whether the camera has obtained an image that includes the physical sign.

In some implementations, the computer-implemented method also includes transmitting location information to the portable mapping device to move to the geographical location and transmitting second location information to the portable mapping device and instructions for the portable mapping device to move to a second location upon receiving the first query response message. The operation of receiving the coordinate data indicative of the geographical location of the portable mapping device includes receiving a confirmation message that the portable mapping device has moved to the geographical location indicated by the location information.

In some implementations, the camera is one of a network of cameras configured to obtain image data for the geographical area. In some implementations, the portable mapping device includes a drone. In some implementations, the physical sign is a pattern. In some implementations, the data indicating whether the camera has obtained an image that includes the physical sign includes data indicating whether the camera has obtained an image of the pattern attached to the drone.

In some implementations, the computer-implemented method includes determining that the camera has obtained an image that includes the physical sign. The physical sign is attached to the portable mapping device at a first position. The computer-implemented method also includes determining that a second camera has not obtained an image that includes the physical sign when the physical sign is attached to the portable mapping device at the first position, transmitting instructions to the portable mapping device to move the physical sign to a second position of attachment to the portable mapping device, and transmitting a second query message to the camera to query whether the camera has obtained an image that includes the physical sign at the second position, and a third query message to the second camera to query whether the second camera has obtained an image that includes the physical sign at the second position.

In some implementations, the computer-implemented method includes receiving, from the camera, a second query response message including data indicating whether the camera has obtained an image that includes the physical sign at the second position, receiving, from the second camera, a third query response message comprising data indicating whether the second camera has obtained an image that includes the physical sign at the second position, and determining, based on the first query response message, the second query response message, and the third query response message, that (i) the physical sign is visible at the second position to the camera and the second camera, and (ii) the physical sign is visible at the first position to the camera and is not visible to the second camera at the first position.

In some implementations, the computer-implemented method includes determining, based on the first query response message, that the camera has not obtained an image that includes the physical sign at a first position of attachment to the portable mapping device, transmitting, to the portable mapping device, a reconfiguration message that includes instructions to rotate the physical sign to a different orientation than an orientation at the first position, transmitting a second query message to the camera to query whether the camera has obtained an image that includes the physical sign at the different orientation, and receiving, from the camera, a second query response message comprising data indicating whether the camera has obtained an image that includes the physical sign at the different orientation.

In some implementations, the computer-implemented method includes determining, based on the first query response message, that the camera has not obtained an image that includes the physical sign at a first position of attachment to the portable mapping device, transmitting, to the portable mapping device, a reconfiguration message that includes instructions to move the physical sign to a second position of attachment to the portable mapping device, transmitting a second query message to the camera to query whether the camera has obtained an image that includes the physical sign at the second position of attachment to the portable mapping device, and receiving, from the camera, a second query response message comprising data indicating whether the camera has obtained an image that includes the physical sign at the second position of attachment to the portable mapping device.

In some implementations, the operation of generating the camera coverage map includes providing data for configuring display of one or more visually-distinguishable indicators for display along with the camera coverage map. The one or more visually-distinguishable indicators includes: a first indicator indicating that images of the physical sign are obtained by the camera; a second indicator indicating that images of the physical sign are obtained by the camera at less than all orientations or less than all positions of the physical sign attached to the portable mapping device; a third indicator indicating that images of the physical sign cannot be obtained by the camera at the geographical location of the portable mapping device; a fourth indicator indicating that images of the physical sign are obtained by a second camera; a fifth indicator indicating that images of the physical sign are obtained by the second camera at less than all orientations or less than all positions of the physical sign attached to the portable mapping device; and a sixth indicator indicating that images of the physical sign cannot be obtained by the second camera at the geographical location of the portable mapping device.

In some implementations, the computer-implemented method includes determining a movement path within the geographical area for the portable mapping device, identifying locations on the movement path at which the camera is to obtain images, and transmitting, to the portable mapping device, data indicative of the locations on the movement path and instructions for the portable mapping device to move to the locations on the movement path in a sequential order.

Other implementations include corresponding systems, apparatus, computer-readable media, and computer programs recorded on computer storage devices, each configured to perform the operations of the methods.

Particular implementations of the subject matter described in this specification can be implemented so as to realize numerous advantages. For example, improving security camera coverage increases the confidence in the security of an area and user satisfaction in the deployed security system. Additionally, by minimizing the number of blind spots, the risk of having little or no evidence of a suspected criminal or terrorist activity occurring within the area can also be minimized. As such, blind spot minimization facilitates law enforcement efforts as well.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 depicts an example of a graphical visualization of security network camera detections of a pattern.

Like reference numbers and designations in the various drawings indicate like elements.

DETAILED DESCRIPTION

A test for determining security camera coverage for a particular area (also referred to as mapping zone) is described with reference to example implementations depicted by the figures.

Figure 1:
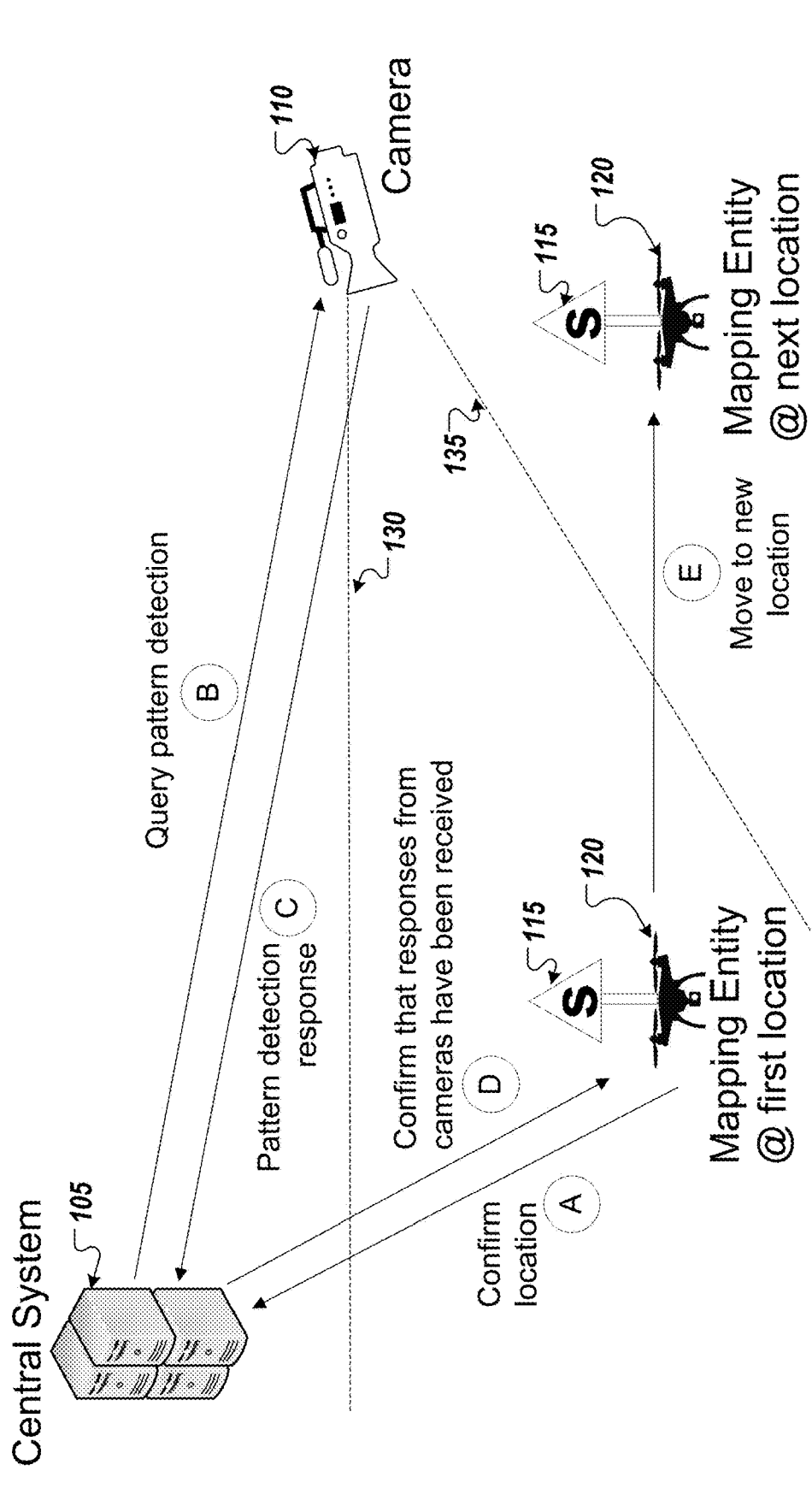
FIG. 1 depicts an example scenario of a mapping entity performing mapping in communication with a security system.

FIG. 1 depicts a part of a security or monitoring system 100 that includes a central system 105, a camera 110, a sign 115, and a mapping entity 120. The camera 110 may be any suitable type of camera capable of capturing still and moving images and communicating image data to the central system 105. More details of the security system 100's camera 110 are provided below. Although only one camera 110 is shown in FIG. 1, a network of cameras may be used for performing the test.

The central system 105 is configured to transmit and receive data and messages to and from mapping entities and security cameras throughout the mapping zone. The central system 105 may include one or more processors and storage systems for processing and storing the data collected from the camera 110 and the mapping entity 120. The processors may also execute programs and instructions for implementing one or more operations for performing the security camera coverage test.

The sign 115 may have a display or board that illustrates a unique pattern associated with the sign 115. In general, various suitable types of graphical patterns may be used as long as the pattern is uniquely associated with the sign 115. The security system 100 may deploy more than one sign at a time.

The sign 115 is transported to different locations in the mapping zone by a mapping entity 120. Although a drone is shown as the mapping entity 120 in FIG. 1, in general, various types of mapping entities may be used, including but not limited to, a human being and a robot. In general, a drone may refer to a computerized machine capable of moving in the air from one point to another, and a robot may refer to a computerized machine that moves on terrain.

For example, in implementations when the mapping entity is a human, the human being may hold the sign 115 throughout different locations of a mapping zone. The human may use a mobile application on the human's portable electronic device to obtain its current coordinate and send messages to the central system 105. In some cases, the mobile application may be configured to report location information and communicate with the central system 105 without any input from the human. In this way, the human mapping entity can be performing other tasks such as cleaning a space or moving from one location to another while the human's portable electronic device communicates with the central system 105. In another example, the sign 115 may be worn by the human, e.g., printed on a sticker stuck to clothing worn by the human or printed on an shirt worn by a human.

In implementations when the mapping entity is a robot, the robot may have a movable arm or fixture that holds the sign 115, or the sign may be affixed to the robot, e.g., printed on a sticker stuck to the robot, and the robot moves the sign 115 by moving itself around the mapping zone. The central system 105 may communicate with the robot to exchange location information and messages. For example, the central system 105 may send instructions containing location coordinates to the robot to move to a particular location. When the robot arrives at the location, the robot may send a message to the central system 105 to confirm that the robot has arrived at the location. The robot may have one or more sensors and radars built in to avoid collisions and navigate safely around the mapping zone. In implementations in which floor plans are utilized, the central system 105 can use the floor plan to guide the robot to a particular location or provide the floor plan to the robot for navigation.

In some implementations, a drone may be used in a similar manner as a robot. The drone may have a receptacle for affixing the sign 115 or an arm to hold, move, and reorient the sign 115. The drone may receive instructions containing location coordinates to move to a particular location. When the drone arrives at the location, the drone may send a message to the central system 105 to confirm that the drone has arrived at the location. The drone may have one or more sensors and radars built in to avoid collisions and navigate safely around the mapping zone. The drone may also use a floor plan for navigation purposes.

Using a drone advantageously allows three-dimensional (3-D) security camera coverage information. For example, a drone can be used to adjust the height, orientation, or position of the sign 115 (in addition to the location) so that pattern detection can be determined according to three-dimension coordinate and not just two-dimension coordinates. A robot or human mapping entity may similarly adjust the height, orientation, or position of the sign 115.

In some implementations, the security system 100 may also deploy an indoor positioning system (IPS), which can provide the coordinate location information of any place within the mapping zone. IPS can provide navigation, guiding, and location services for movement within a mapping zone, such as a building, park, or house. In some cases, if a floor plan or layout of the mapping zone is available, the IPS may combine the floor plan or layout of the mapping zone with a coordinate system such that locations in the floor plan or layout can be specified by location coordinates provided by the IPS.

Referring back to FIG. 1, the mapping entity 120 may move the sign 115 in any direction and in incremental steps of varying sizes. The mapping entity 120 may determine its own path or may move according to instructions provided by the central system 105. In the example shown in FIG. 1, the mapping entity may move the sign 115 from a first location to the next location and may take any suitable path including, but not limited to, a zig-zag path, a linear path, or a circular path.

Each time the mapping entity 120 moves the sign 115 to a new location, the mapping entity 120 may transmit its current location's coordinates to the central system 105 (operation A). In some implementations, when the mapping entity 120 begins its mapping operation, the mapping entity 120 may also send the central system 105 data indicative of the type of pattern the sign 115 is displaying. For example, in FIG. 1, the mapping entity 120 may send data to the central system 105 that indicates that its pattern is a "s" letter. The data indicative of the type of pattern may include an image of the pattern, a textual description of the pattern, and/or, in general, any suitable information that describes the pattern on sign 115.

In some implementations, an administrator of the central system 105 may place the sign 115 on mapping entity 120 when the mapping entity 120 is a robot or a drone. The administrator may then send an image or provide data describing the sign 115 so that the central system 105 can store data indicative of the sign 115. In some cases, the central system 105 may share the data indicative of the sign 115 with the mapping entity 120 so that the mapping entity 120 is aware of the sign 115 it is carrying.

Upon receiving the mapping entity 120's current location coordinates and, in some cases, the data indicative of the type of pattern, the central system 105 may query all security cameras covering the mapping zone, such as camera 110, to provide information indicating whether or not the pattern is currently in the camera's view (operation B). The central system 105 may provide the cameras information on the pattern to be detected such as an image or the pattern or data describing the pattern.

In response to receiving the instructions from the central system 105, the camera 110 may capture a current live view. In some implementations, the camera 110 may process the live image using various suitable pattern detection techniques to determine whether the pattern is present in the current live view image of camera 110. In some implementations, the camera 110 may transmit (operation C) the captured current live view image to a processor, e.g., the central system 105's processor, which may subsequently perform the pattern recognition operation.

If the pattern is detected in the current live view image, the camera 110 or a processor connected to the camera 110 may determine that the camera 110 has detected the pattern. If the pattern is not detected in the current live view image, the camera 110 or processor connected to the camera 110 will determine that the camera 110 has not detected the pattern. In larger networks, this determination/detection step may be performed locally at the camera 110 to avoid network congestion and delays in processing images received from multiple cameras at or around the same time. When the camera 110 performs this determination operation, it may send the result of the determination to the central system 105 (operation C) to inform the central system 105 whether or not the pattern was detected in its current view.

In the example shown in FIG. 1, camera 110's field of view is limited to the area between lines 130 and 135. Mapping entity 120 and sign 115 with the pattern are viewable in a live feed of camera 120. Camera 120 then transmits a response message to the central system 105 (operation C) indicating that the "S" pattern was detected.

The central system 105 maintains a record of the responses it receives from all the security cameras in its network. The central system 105 may wait until responses have been received from all the security cameras in its network (or until it has made a determination itself) indicating whether or not the pattern is currently visible by the cameras. The central system 105 may then send a message to the mapping entity 120 indicating that data from all the cameras has been obtained (operation D). The mapping entity 120 may interpret this message as authorization to move to the next location, and may then advance to the next location (operation E).

Figure 2C:
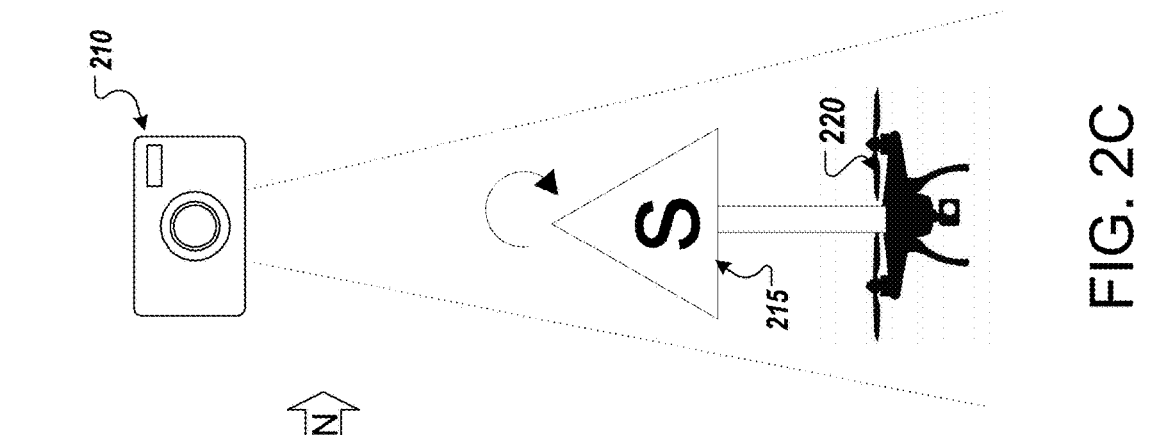
FIGS. 2A, 2B, and 2C depict an example of camera coverage when a sign is rotated.
Figure 2B:
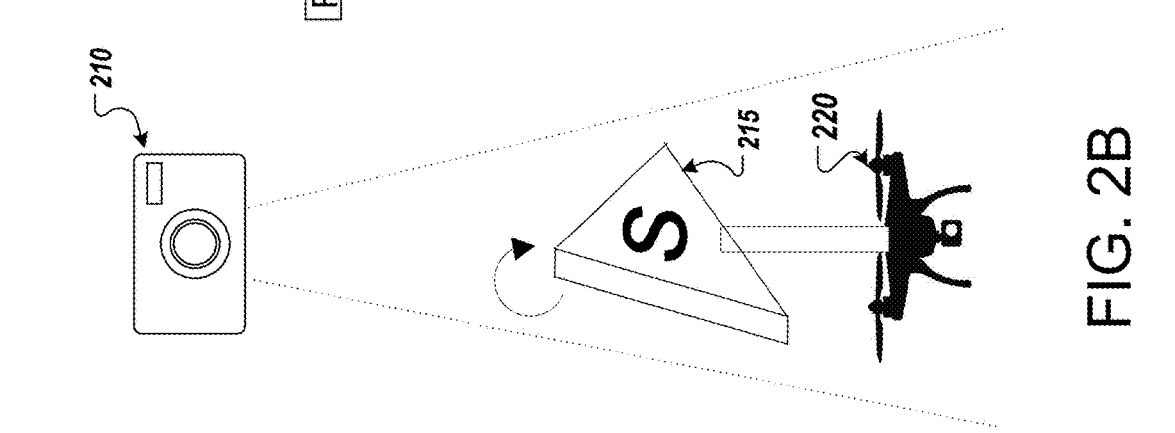
Figure 2A:
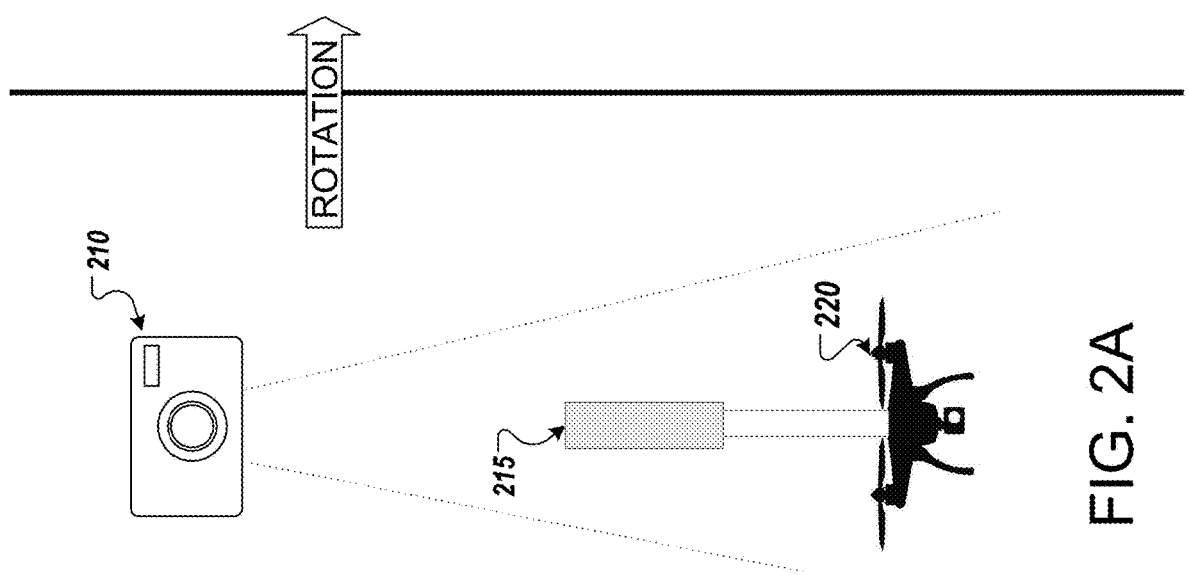

In some implementations, the above-described testing procedure can be conducted at the same location but at different orientations, positions, and angles of holding the sign. For example, FIGS. 2A-2C depict an example of a mapping entity 220 holding a sign 215. In FIG. 2A, the sign 215 is held at an angle such that the pattern on sign 215 cannot be seen by camera 210 even though the mapping entity 220 and sign 215 are within the field of view of the camera 210. This may happen, for example, in instances when the sign 215 is held in a manner that is parallel to the line of sight with a lens of the camera 210. In another example, if the mapping entity 220 is a person, the sign 215 may be visible on only one side of the person, such as the person's back, but not on the person's front, which may be in the camera 210's view.

When a pattern is not visible, the mapping entity 220 may modify the position, elevation, or orientation of the sign 215. In some cases, the mapping entity 220 may adjust the height of the sign 215. In other cases, as shown in FIGS. 2A-2C, the mapping entity 220 may adjust the orientation of the sign 215. For example, as shown in FIG. 2B, the mapping entity 220 may rotate the sign 215 along its z-axis or handle. The sign 215 may be rotated at various angles, for example, less than 90° clockwise, as shown in FIG. 2B, or 90° clockwise, as shown in FIG. 2C. When sign 215 is rotated less than 90° clockwise, as shown in FIG. 2B, the pattern may only be partially visible by camera 210. When sign 215 is rotated 90° clockwise, as shown in FIG. 2C, the pattern may be fully visible by camera 210 as the pattern is perpendicular to the line of sight between the lens of the camera 210 and the sign 215.

Figure 2D:
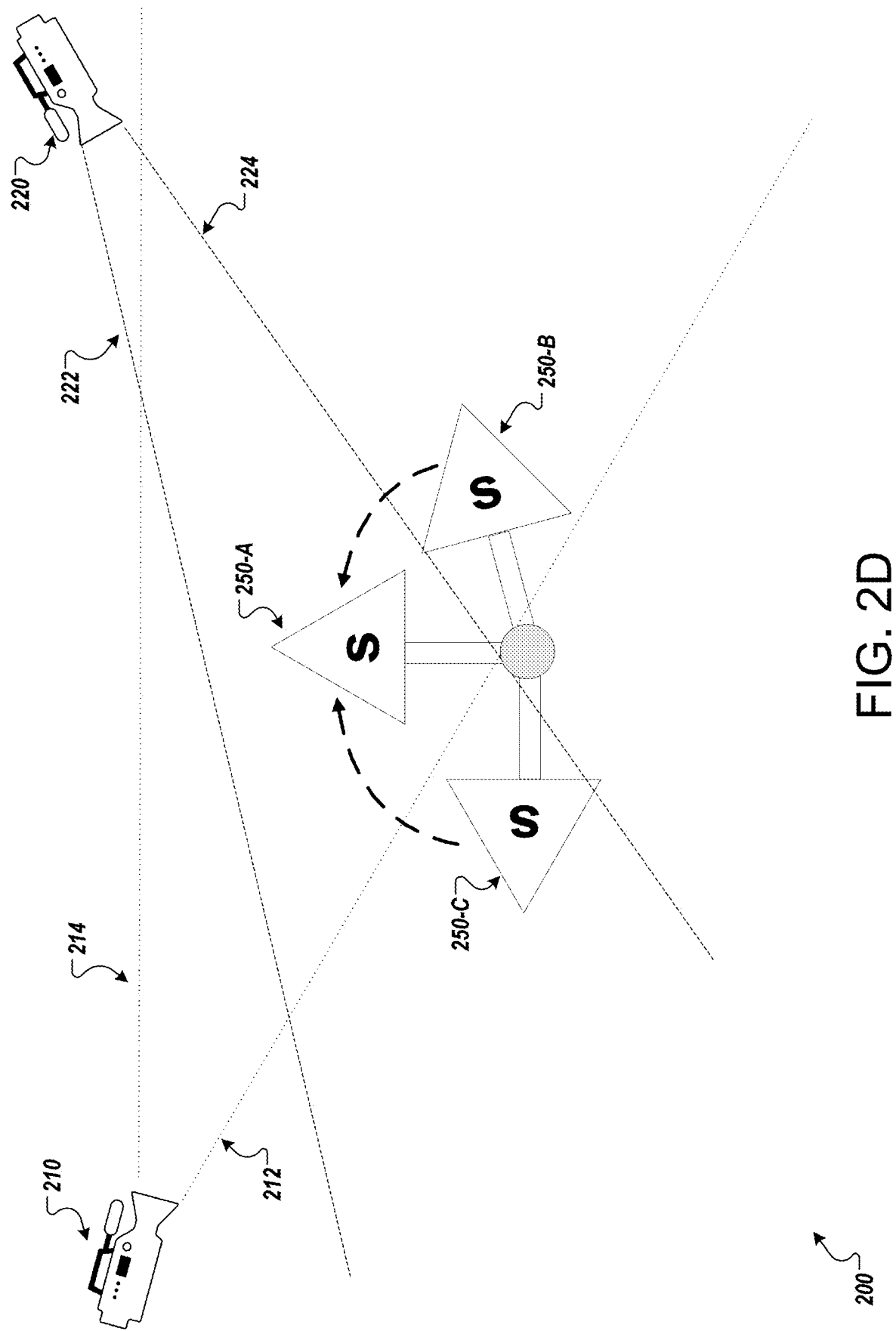
FIG. 2D depicts an example of camera coverage when a sign is rotated.

FIG. 2D depicts an example in which a sign 250 is rotated at the base of its handle. In FIG. 2D, the security system 200 may include two cameras 210 and 220. Camera 210 has a viewing angle defined by lines 212 and 214. Camera 220 has a viewing angle defined by lines 222 and 224. A mapping entity moves a sign into the mapping zone. Initially, the sign may be held in an upright position 250-A perpendicular to the ground. In position 250-A, the pattern can be viewed by camera 210 and camera 220.

In another example, the sign may initially be held at position 250-B. At position 250-B, the pattern cannot be seen by camera 220. The pattern can only be viewed by camera 210. In some implementations, the central system may modify the position that the sign is held by sending instructions to the mapping entity to adjust its position to position 250-A. The mapping entity may rotate the sign counter-clockwise by, for example about 70°, to position 250-A, where it is then detected by both cameras 210 and 220.

In another example, the sign may initially be held at position 250-C. At position 250-C, the pattern cannot be seen by camera 220. The pattern can only be viewed by camera 220. In some implementations, the central system may modify the position that the sign is held by sending instructions to the mapping entity to adjust its position to position 250-A. The mapping entity may rotate the sign clockwise by, for example about 90°, to position 250-A, where it is then detected by both cameras 210 and 220.

In some implementations, the sign 215 may be implemented as a three-dimensional sign such as a cube, rectangular box, or pyramid. Different faces of the sign may have an image of the pattern so that the pattern can be seen from different angles and orientations, and the sign does not have to be rotated. In some implementations, to further facilitate the detection of a pattern, the sign 215 may also have a light source or illuminator attached to it. The light source may be configured to illuminate the pattern so that the pattern may be visible even when environmental lighting conditions may not be ideal. The light source may be connected to a power supply and controller that provide power to the light source and can turn it on or off. Examples of the light source include, but are not limited to, a light emitting diode (LED) and light bulbs, e.g., halogen bulbs and fluorescent bulbs.

By obtaining camera data based on the location, position, and/or orientation of a pattern, the central system may generate a graphical representation of the coverage of the mapping zone by security cameras that are part of the security system. In particular, after obtaining responses from the security network cameras, the central system may plot the responses on a visualization map (also referred to as camera coverage map). An example of a visualization map is shown in FIG. 3. If a coordinate is detected by any security network camera, the coordinate may be marked using a first visual indicator, such as a diamond shape 310. If a coordinate is not detected by a security network camera in the mapping zone, the coordinate may be marked using a second visual indicator, such as a circular shape 320. While a diamond and circular shape are used as examples of visual indicators in the visualization map shown in FIG. 3, in general, various types of suitable indicators with variations in shape, size, and color may be used.

By displaying test results using a graphical representation such as the visualization map shown in FIG. 3, a user of the security system can easily determine which areas are covered by the security network cameras and which areas are not covered by the security network cameras. The user may then take any remedial steps such as installing new cameras or adjusting the position or angle of existing cameras to obtain additional coverage.

In some cases, when rendering a two-dimensional (2D) map, a coordinate may have multiple results. This may occur for example, when a sign may be visible at some positions or orientations at a particular location but not at other positions or orientations. In some implementations, the central system 105 may be configured to label such locations using a third visual indicator, e.g., a pentagon icon, that is different from the first and second visual indicators. The third visual indicator will indicate that certain locations have conditional mapping coverage that depends on the position or orientation that an object is positioned or oriented in at a particular location.

In some implementations, the central system 105 may be configured to designate any location with any type of camera coverage (e.g., irrespective of the position or orientation) as being covered. Accordingly, the visualization map may label that location using the first visual indicator. In some implementations, if a floor plan or layout is used, the visualization map may be superimposed upon the floor plan or layout. In such cases, the visual indicators may be drawn on the floor plan or layout.

While FIG. 3 depicts an example of a simplified visualization map, other variations of visualization maps and suitable graphical representations may be used. For example, visual indicators may be shown using different colors, which respectively represent different cameras (e.g., red=no detection by any camera, blue=detection by camera 1, yellow=detection by camera 2; half blue, half yellow=detection by cameras 1 and 2). The visualization map may be generated in real time, as data is collected from security cameras, periodically at predetermined times, or according to a particular schedule.

Figure 4:
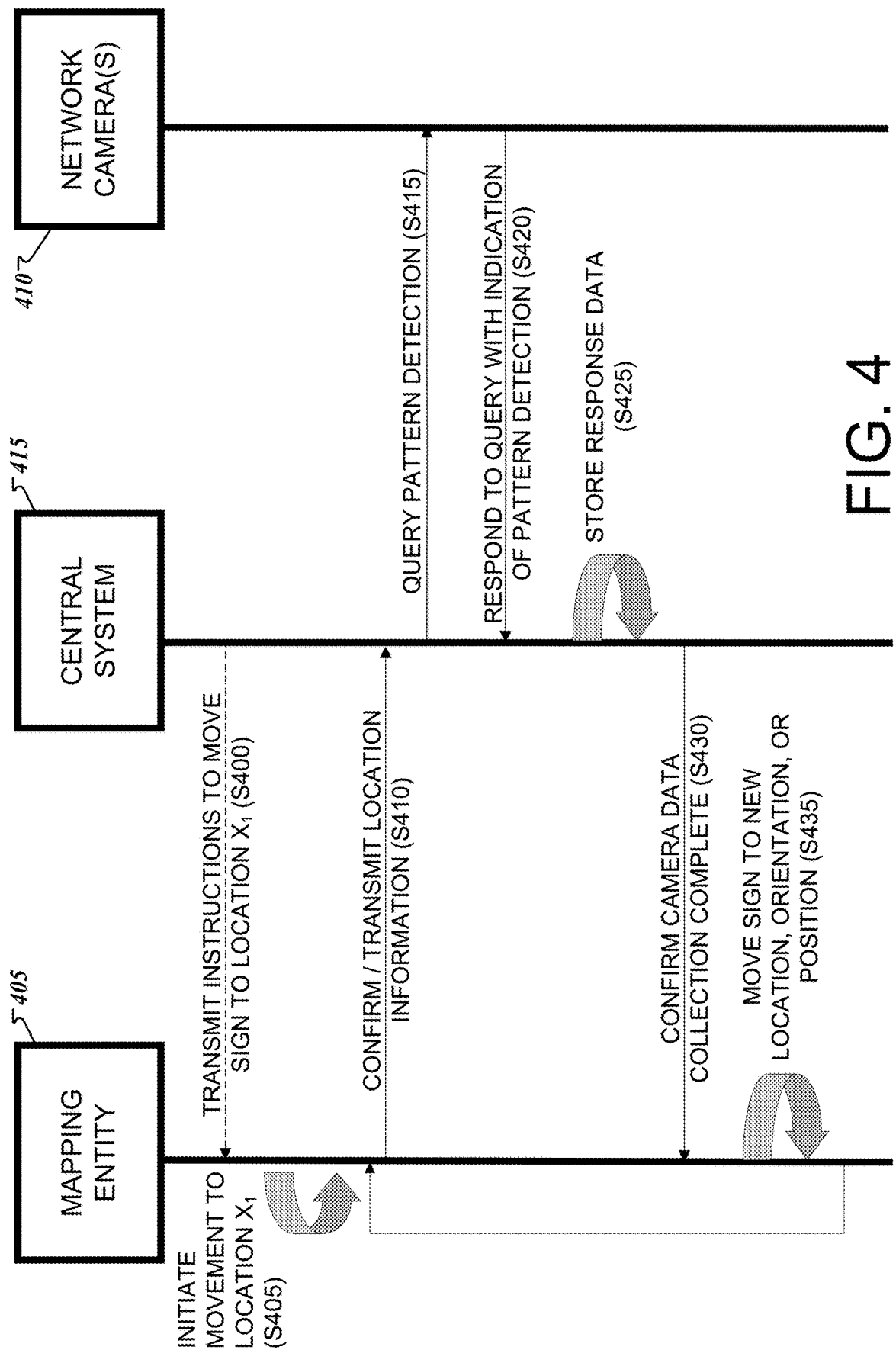
FIG. 4 depicts an example interaction diagram between a mapping entity, a central system, and network cameras for mapping a mapping zone.

FIG. 4 depicts an example interaction diagram between a mapping entity 405, a central system 415, and network camera(s) 410 for mapping a mapping zone. The mapping entity 405, central system 415, and network camera(s) 410 may be configured to communicate with each other using a wired and/or wireless network and may all be part of a security monitoring system, described in further detail below with respect to FIG. 5.

In some implementations, the central system 415 may transmit a message containing instructions for the mapping entity 405 to move its mapping sign with a pattern to an initial location $X_1$ for initiating the mapping of a mapping zone (S400). The instructions may contain location coordinates of the initial location $X_1$ and optionally position or orientation information. The coordinates may be specified using various suitable methods, including, for example, using an indoor positioning system (IPS). For example, if the mapping entity 405 were being configured to map an office building, the central system 415 may transmit location coordinates of an entry point of the building, a basement of the building, or a lobby of the building as the initial location for mapping the building.

In some implementations, the central system 415 does not transmit a message to the mapping entity 405 to begin mapping. Rather, the mapping entity 405 may initiate mapping by moving to the initial location $X_1$ on its own. For example, if a person and the person's electronic device are the mapping entity 405 for mapping an office space, when the person decides to leave a desk and walk through the office space, the person may initiate mapping by moving to the initial location $X_1$ in the office.

After arriving at location $X_1$, the mapping entity 405 may transmit a message to the central system 415 and provide coordinate information of its location (and optionally position and orientation) (S410). For implementations in which the central system 415 sent instructions to the mapping entity 405 to move to location $X_1$, the mapping entity 405 may transmit a confirmation message indicating that it has arrived at location $X_1$. The message transmitted from the mapping entity 405 may also include data indicative of the type of pattern being displayed by the sign. The data indicative of the type of pattern may include an image of the pattern, a textual description of the pattern, and/or, in general, any suitable information that describes the pattern on the sign. For example, when mapping an office building, the mapping entity 405 may send a message to the central system 415 confirming that the mapping entity 405 is located at an initial mapping point of the building (e.g., a lobby of the building) and may provide an image of pattern "SSS" held by the sign attached to the mapping entity 405.

After receiving a confirmation message or message with location information from the mapping entity 405, the central system 415 may transmit a query message to all the network camera(s) 410 to inquire whether or not the network camera(s) 410 are currently capturing the pattern being displayed by the sign (S415). The query message may also include data indicative of the type of pattern, as described above. For instance, when a "SSS" pattern is being used, the query message may include an image of a "SSS" pattern and/or data describing the "SSS" pattern in the query message such as font type, color, size, shape, and other features of the pattern.

Upon receiving the query message and data indicative of the type of pattern, the network camera(s) 410 may capture an image of the current view of each respective camera. In some implementations, each of the network camera(s) 410 may execute one or more pattern detection algorithms to determine whether the image captured by the network camera(s) 410 includes the pattern being displayed by the sign held my mapping entity 405. For example, a processor in each of the network camera(s) 410 may execute a pattern detection algorithm to detect whether an image captured by the network camera(s) 410 includes a pattern (e.g., a "SSS" pattern) that matches the pattern for a which the query message was sent from the central system 415. For example, when a "SSS" pattern is being used, the network camera(s) 410 may determine whether a "SSS" pattern is present in a captured image and, if so, if it matches other data describing the "SSS" pattern included in the query message. In some implementations, the network camera(s) 410 may utilize a confidence threshold such that if the pattern detection algorithm determines that the probability that a pattern in a captured image matches the pattern specified by the query message is greater than or equal to the confidence threshold hold, then the pattern specified by the query message is likely present in the captured image.

If the pattern is determined to be present in the captured image, the camera of the network camera(s) 410 that captured the image or a processor processing the captured image may determine that the camera has detected the pattern. If the pattern is determined not to be present in the captured image, the camera or processor processing the captured image may determine that the camera has not detected the pattern. After making the determination, each camera of the network camera(s) 410 may respond to the central system 415's query by sending a query response message that includes the result of the determination to inform the central system 415 whether or not a sign with the pattern was detected by the camera (S420).

In some implementations, the central system 415 may be configured to map an entire mapping zone and may therefore wait to receive responses from all the network camera(s) 410. In some implementations, the central system 415 may be configured to map only a portion of a mapping zone and may therefore wait to receive responses only from a predetermined set of cameras monitoring the portion of the mapping zone.

The central system 415 may store the response data that indicates whether or not the pattern is detected by the network camera(s) 410 (S425). The response data may be stored at a storage device integrated with the central system 415 or a storage device with which the central system 415 can communicate data with. Examples of suitable storage devices are described in more detail below.

After receiving responses from the predetermined set of cameras of the network camera(s) 410, the central system 415 may transmit a confirmation message to the mapping entity 405 to confirm that the central system 415 has completed data collection from the network cameras (S430). In some implementations, if the central system 415 would like to redirect the mapping entity to a different location, position, or orientation, the central system 415 may transmit coordinate information for the next location, position, or orientation that the mapping entity 405 should move to. This coordinate information may be transmitted with the confirmation message to the mapping entity 405.

After receiving the confirmation message received from the central system 415, the mapping entity 405 may move the sign to the next location, orientation, and/or position (S435). The next location, orientation, and/or position may, in some implementations, be obtained from the confirmation message received from the central system 415. In some implementations, if a response message received from a network camera(s) 410 indicates that a sign with the pattern was not detected, the central system 415 may transmit instructions for the mapping entity 220 to modify the position, elevation, or orientation of the sign in the manner described above with respect to FIGS. 2A-2D. In some implementations, the mapping entity 405 may determine the next location, orientation, and/or position. For example, the mapping entity 405 may use a floor plan of the mapping zone and determine a path for mapping the mapping zone. The mapping entity 405 may identify different locations, orientations, and positions of the sign along the path for completing the mapping. The mapping entity 405 may then sequentially move through the mapping zone according to the determined path and repeat operations S410-S435 at each location, orientation, and position. After the mapping entity 405 moves to a different location, query messages may be sent to the network camera(s) 410 and responses may be received from the network camera(s) 410 to determine which network camera(s) 410 have detected the pattern on the sign.

At the last location, orientation, and position in the path, the mapping entity 405 may terminate its mapping operation. The network camera responses may be used by the central system to generate a visualization map/camera coverage map or graphical representation of the mapping zone's camera coverage, as described above and illustrated in FIG. 3.

In the operations described above, pattern detection is performed by network camera(s) 410. However, in some implementations, pattern detection may not be performed by the network camera(s) 410. Instead, images captured by the network camera(s) 410 may be transmitted to the central system 415. A processor integrated with or connected to the central system 415 may execute the pattern detection algorithms to determine if the captured image from a particular network camera includes the pattern on the sign. If the pattern is detected in a captured image, the central system 415 may determine that the particular network camera has detected the pattern. If the pattern is not detected in the captured image, the central system 415 may determine that the particular network camera has not detected the pattern. Subsequent operations will be performed as described above with respect to operations S425, S430, and S435.

The following paragraphs describe some example implementations and use case scenarios.

In one example implementation, a test may be performed using multiple mapping entities that are employees in an office. The employees may wear a white shirt with a pattern in the front and the back (each shirt should have different pattern) and install an app on their phone that will send and receive messages to the central system. The messages may be sent and received periodically in the background while the employees perform that daily tasks on the job. In this manner, the app in the employees' phones can communicate with the central system to execute the test with minimal disruption to the employees' jobs. The test can end after the employee stops the test or the app detects that the employee has left the building through its current location.

The employee example can be particularly effective if the employees are from a group that moves in various locations of a mapping zone as part of the employee's job. One example of such a group is janitors. When a janitor starts a cleaning job, the janitor may click on the start button a mapping app on the janitor's phone. The app may prompt the janitor to enter the pattern on his/her shirt. The app may then run in the background and periodically send a message with the current coordinate and the pattern to the central system. After the janitor is finished with the cleaning job, the janitor may press a stop button on the app to terminate the mapping. After one or more janitors performing cleaning duties in a mapping zone have completed their respective jobs, a user of the security system may view the coverage test result generated by the central system.

In another example implementation, the mapping entity may be a robot. A user of a security system may initiate the mapping test through a security system user interface. Using the user interface, the user may specify a particular mapping zone to be mapped, such as a floor, building, or park, and the time during which the test should be conducted. If available, the user may upload one or more floor plans for the mapping zone. If a floor plan is not available, the user may input location coordinate data for locations that the user wants the robot to cover.

The user may also provide particular instructions for the testing, e.g., if the user wants to configure the testing for a particular part of the mapping zone during a particular time period. For instance, tests in office buildings may be configured to be conducted at night to avoid interfering with the movement of people or creating distractions during office hours.

In some cases, the user may utilize other components of the security system, which is described in further detail below with respect to FIG. 5, to determine whether desired testing conditions are present. For example, the user may check to see the lighting conditions in the mapping zone. If there is poor lighting, the cameras may not be able to identify a pattern in an image. Accordingly, if the user determines that the lighting in the mapping zone is not sufficient, the user may control the lighting system to increase lighting in areas of the mapping zone with poor lighting. The user may interact with the lighting system through the security system, which may be connected to the lighting system as well as the security system.

Other testing conditions may include, but are not limited to accessibility within a mapping zone and impedances in a mapping zone. For example, the user may check to see whether the doors in the mapping zone are unlocked and sufficiently open to allow a robot to move from one room to another. If the doors are locked or are not sufficiently open, the user may send instructions through the security system to unlock and/or move the door to a position that allows the robot to move past the door.

In another example, the user may check to see how crowded a mapping zone is. The user may use a video feed providing visual information on one or more parts of the mapping zone and may determine that the mapping zone is too crowded by people or furniture to permit the movement of the robot through the space. If the mapping zone is crowded by people, the user may select a time for conducting the text when the mapping zone is not as crowded, e.g., night time in an office building. If the mapping zone has too much furniture, the user may postpone the testing until the furniture has been rearranged in a manner that will allow the testing to take place.

After checking the testing conditions and providing the information for conducting the mapping test, the user may send a command through the user interface to begin testing. A robot used as the mapping entity will receive an instruction from the central system to initiate the test along with location coordinates for the first point to begin the test.

While conducting the test and moving through the mapping zone, the robot may use a navigation unit and various built-in sensors or communicate with other network sensors (e.g., such as motion sensors, light sensors) to detect obstacles, measure distance travels, and discover new areas. If the central system or the robot has access to a floor plan of the mapping zone, the central system or robot may use the floor plan to guide the robot from one location to the next location until all areas of the mapping zone have been covered. If a wheeled robot is deployed as the mapping entity, a 2-D floor plan may be used. If a flying robot, such as a drone, is deployed as the mapping entity, a 3-D floor plan may be used.

Each time the robot sends a message with coordinate information of its current location to the central system, the central system may mark that coordinate as having been visited in the floorplan and find the next coordinate in the floorplan that is closest to the current coordinate that hasn't been tested. After collecting camera data as described above, the central system may respond with a message that contains that coordinate and/or instructions to move to the next location. The robot will try to move to the location with that coordinate with the assistance of a navigation unit and sensors. After it reaches that coordinate, the process of sending message and moving to the next coordinate may be repeated.

If the robot cannot reach a particular location coordinate in a threshold amount of time, for example, due to an obstacle, the robot may send a different message to the central system with that coordinate. For instance, in some cases, the robot may indicate that there is a delay in reaching a desired location.

In some cases, the robot may use light sensors to determine if an area of the mapping zone has sufficient lighting. In some cases, the robot may communicate with the central system to determine if a locked door can be opened. If the lighting is insufficient or a door is locked, the robot may send a request to the security system through the central system requesting the security system to unlock/open the door and/or increase the lighting in the area. The security system may then respond by unlocking/opening the door and/or increasing the lighting in an area. Such environmental checks and adjustments may add delay to testing.

After the robot has traversed through an area that, prior to testing, had insufficient light and/or accessibility, the central system may send instructions to the security system to return to the conditions that existed prior to the robot entering the area. Thus, if an area of the mapping zone was previously unlit, after the robot finishes mapping the locations in the area and leaves the area, the security system may turn off the lights in the area.

In some cases, if the robot cannot reach a particular location due to an impedance (e.g., a wall), the robot may send a message to the central system indicating that it is unable to map the particular location. The central system will mark that coordinate as unreachable in the floorplan and then reply with a different coordinate that the robot should move to. When the central system determines that the robot has attempted to visit all spots in the floorplan, the central system may generate a test result with a visualization map and send a message to the user with the result or instructions on how to access the result.

A user of the security system can repeat this process at various mapping zones. If the robot is a wheeled robot, the user may move the robot to another mapping zone such as another floor of a building to start the coverage test for that floor and repeat the test for all the floors in the building. If the robot is a flying robot like a drone, the drone may use a floor plan to navigate its way from one floor to another without human assistance.

Figure 5:
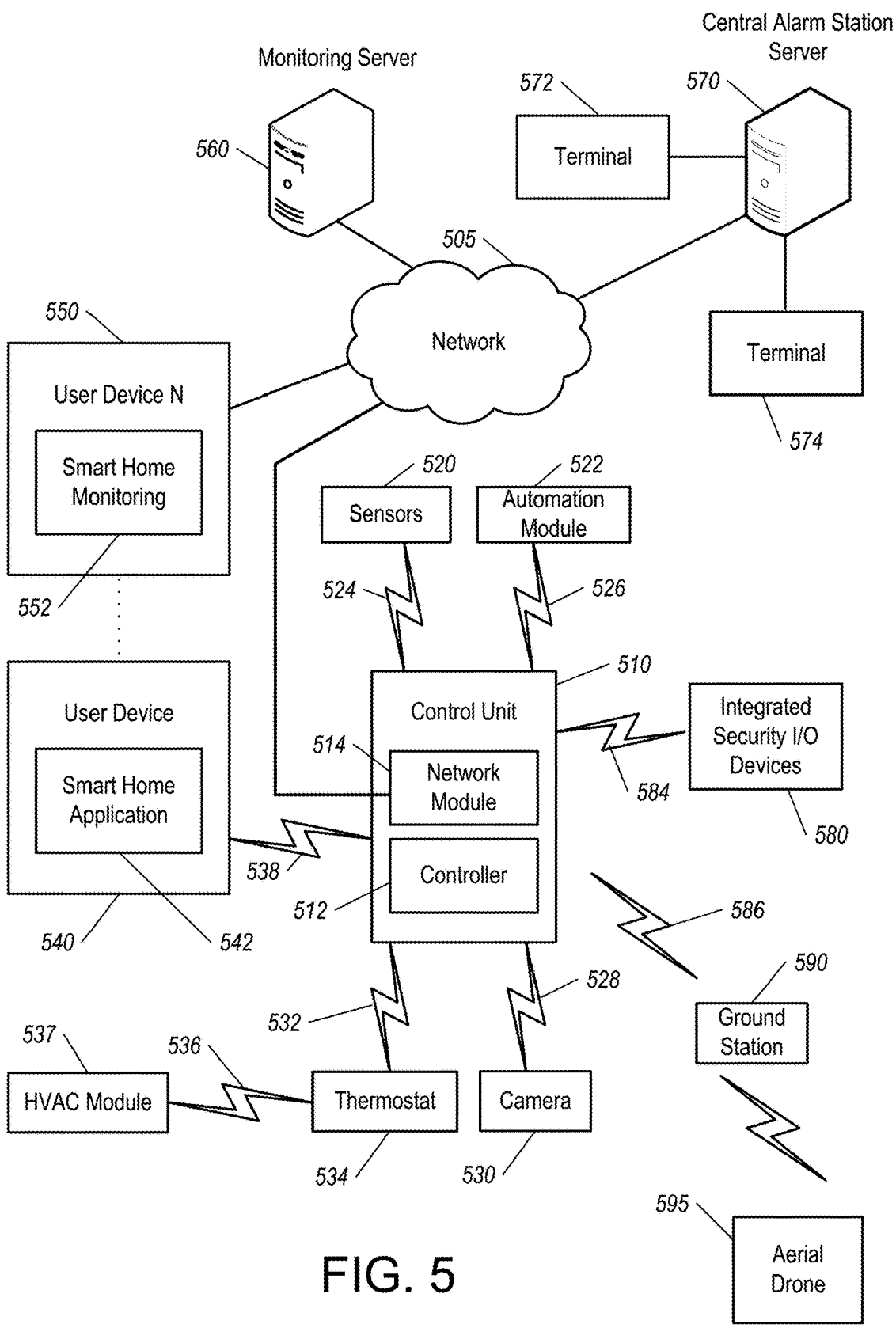
FIG. 5 depicts an example security system.

FIG. 5 illustrates a block diagram of an example security monitoring system 500. The security system 500 includes a network 505, a control unit 510, one or more user devices 540, 550, a monitoring server 560, and a central alarm station server 570. In some examples, the network 505 facilitates communications between the control unit 510, the one or more user devices 540, 550, the monitoring server 560, and the central alarm station server 570. This example further includes a drone system that includes a ground station 590 and an aerial drone 595. In some implementations, the control unit 510 can communicate the ground station 590, the aerial drone 595, or both via a communication link 586 to provide event information such as an alarm event. The aerial drone 595 can be configured to launch based on receiving an alarm event or instructions from the central system, as described above.

The network 505 is configured to enable exchange of electronic communications between devices connected to the network 505. For example, the network 505 can be configured to enable exchange of electronic communications between the control unit 510, the one or more user devices 540, 550, the monitoring server 560, and the central alarm station server 570. The network 505 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 can include multiple networks or subnetworks, each of which can include, for example, a wired or wireless data pathway. The network 505 can include a circuit-switched network, a packet-switched data network, or any other network able to carry electronic communications (e.g., data or voice communications). For example, the network 505 can include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 can include one or more networks that include wireless data channels and wireless voice channels. The network 505 can be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 can include a processor or other control circuitry configured to execute instructions of a program that controls operation of a control unit system. In these examples, the controller 512 can be configured to receive input from sensors, flow meters, or other devices included in the control unit system and control operations of devices included in the household (e.g., speakers, lights, doors, etc.). For example, the controller 512 can be configured to control operation of the network module 514 included in the control unit 510.

The network module 514 is a communication device configured to exchange communications over the network 505. The network module 514 can be a wireless communication module configured to exchange wireless communications over the network 505. For example, the network module 514 can be a wireless communication device configured to exchange communications over a wireless data channel and a wireless voice channel. In this example, the network module 514 may transmit alarm data, image data, or camera response data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also can be a wired communication module configured to exchange communications over the network 505 using a wired connection. For instance, the network module 514 can be a modem, a network interface card, or another type of network interface device. The network module 514 can be an Ethernet network card configured to enable the control unit 510 to communicate over a local area network and/or the Internet. The network module 514 also can be a voice band modem configured to enable the alarm panel to communicate over the telephone lines of Plain Old Telephone Systems (POTS).

The control unit system that includes the control unit 510 includes one or more sensors. For example, the security system can include multiple sensors 520. The sensors 520 can include a lock sensor, a contact sensor, a motion sensor, or any other type of sensor included in a control unit system. The sensors 520 also can include an environmental sensor, such as a temperature sensor, a water sensor, a rain sensor, a wind sensor, a light sensor, a smoke detector, a carbon monoxide detector, an air quality sensor, etc. In some examples, the sensors 520 can include a radio-frequency identification (RFID) sensor that identifies a particular article that includes a pre-assigned RFID tag.

The control unit 510 communicates with an automation module 522 and the camera 530 to perform monitoring. The automation module 522 is connected to one or more devices that enable mapping zone automation control. For instance, the automation module 522 can be connected to one or more lighting systems and can be configured to control operation of the one or more lighting systems. The automation module 522 can be connected to one or more electronic locks at the mapping zone and can be configured to control operation of the one or more electronic locks (e.g., control Z-Wave locks using wireless communications in the Z-Wave protocol. Further, the automation module 522 can be connected to one or more appliances at the mapping zone and can be configured to control operation of the one or more appliances. The automation module 522 can include multiple modules that are each specific to the type of device being controlled in an automated manner. The automation module 522 may control the one or more devices based on commands received from the control unit 510. For instance, the automation module 522 may cause a lighting system to illuminate an area to provide a better image of the area when captured by a camera 530.

The camera 530 can be a video/photographic camera or other type of optical sensing device configured to capture images. For instance, the camera 530 can be configured to capture images of an area within a mapping zone monitored by the control unit 510. The camera 530 can be configured to capture single, static images of the mapping zone and also video images of the mapping zone in which multiple images of the mapping zone are captured at a relatively high frequency (e.g., thirty images per second). The camera 530 can be controlled based on commands received from the control unit 510.

The camera 530 can be triggered by several different types of techniques. For instance, a Passive Infra-Red (PIR) motion sensor can be built into the camera 530 and used to trigger the camera 530 to capture one or more images when motion is detected. The camera 530 also can include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the automation module 522, etc.) to improve image quality when the scene is dark. An integrated or separate light sensor can be used to determine if illumination is desired and may result in increased image quality.

The camera 530 can be programmed with any combination of time/day schedules, system "arming state," or other variables to determine whether images should be captured or not when triggers occur. The camera 530 may enter a low-power mode when not capturing images. In this case, the camera 530 may wake periodically to check for inbound messages from the controller 512. The camera 530 can be powered by internal, replaceable batteries if located remotely from the control unit 510. The camera 530 may employ a small solar cell to recharge the battery when light is available. Alternatively, the camera 530 can be powered by the controller's 512 power supply if the camera 530 is co-located with the controller 512.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a mapping zone and/or environmental data at a mapping zone. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A HVAC module 537 is connected to one or more components of an HVAC system associated with a mapping zone, and is configured to control operation of the one or more components of the HVAC system. In some implementations, the HVAC module 537 is configured to monitor energy consumption of the HVAC system components, for example, by directly measuring the energy consumption of the HVAC system components or by estimating the energy usage of the one or more HVAC system components based on detecting usage of components of the HVAC system. The HVAC module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices can include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

Devices such as the sensors 520, the automation module 522, the camera 530, the thermostat 534, and the integrated security devices 580 communicate with the controller 512 over communication links 524, 526, 528, 532, 584, and 586. The communication links 524, 526, 528, 532, 584, and 586 can be a wired or wireless data pathway configured to transmit signals from the sensors 520, the automation module 522, the camera 530, the thermostat 534, and the integrated security devices 580 to the controller 512. The sensors 520, the automation module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 can include a local network. The sensors 520, the automation module 522, the camera 530, the thermostat 534, and the integrated security devices 580, and the controller 512 may exchange data and commands over the local network. The local network can include 502.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 5 (CAT6) wired Ethernet network. The local network can be a mesh network constructed based on the devices connected to the mesh network.

The monitoring server 560 is an electronic device configured to provide monitoring services by exchanging electronic communications with the control unit 510, the one or more user devices 540, 550, and the central alarm station server 570 over the network 505. For example, the monitoring server 560 can be configured to monitor events (e.g., alarm events) generated by the control unit 510. In this example, the monitoring server 560 may exchange electronic communications with the network module 514 included in the control unit 510 to receive information regarding events (e.g., alerts) detected by the central alarm station server 570. The monitoring server 560 also may receive information regarding events (e.g., alerts) from the one or more user devices 540, 550.

In some implementations, the monitoring server 560 may route alert data received from the network module 514 or the one or more user devices 540, 550 to the central alarm station server 570. For example, the monitoring server 560 may transmit the alert data to the central alarm station server 570 over the network 505. The monitoring server 560 may store sensor and image data received from the security system and perform analysis of sensor and image data received from the security system. Based on the analysis, the monitoring server 560 may communicate with and control aspects of the control unit 510 or the one or more user devices 540, 550.

The central alarm station server 570 is an electronic device configured to provide alarm monitoring service by exchanging communications with the control unit 510, the one or more user devices 540, 550, and the monitoring server 560 over the network 505. For example, the central alarm station server 570 can be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540, 550 and/or the monitoring server 560.

The central alarm station server 570 is connected to multiple terminals 572 and 574. The terminals 572 and 574 can be used by operators to process alerting events. For example, the central alarm station server 570 may route alerting data to the terminals 572 and 574 to enable an operator to process the alerting data. The terminals 572 and 574 can include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a motion detection from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 can be mobile devices or devices designed for a specific function. Although FIG. 5 illustrates two terminals for brevity, actual implementations can include more (and, perhaps, many more) terminals. The one or more user devices 540, 550 are devices that host and display user interfaces. For instance, the user device 540 is a mobile device that hosts one or more native applications (e.g., the smart home application 542). The user device 540 can be a cellular phone or a non-cellular locally networked device with a display. The user device 540 can include a cell phone, a smart phone, a tablet PC, a personal digital assistant ("FDA"), or any other portable device configured to communicate over a network and display information. For example, implementations may also include mobile communication devices, tablets, electronic organizers, portable music players, other communication devices, and handheld or portable electronic devices for gaming, communications, and/or data organization. The user device 540 may perform functions unrelated to the security system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Google Android, Windows Mobile, etc. The smart home application 542 enables the user device 540 to receive and process image and sensor data from the security system.

The user device 550 can be a general-purpose computer (e.g., a desktop personal computer, a workstation, or a laptop computer) that is configured to communicate with the monitoring server 560 and/or the control unit 510 over the network 505. The user device 550 can be configured to display a smart home user interface 552 that is generated by the user device 550 or generated by the monitoring server 560. For example, the user device 550 can be configured to display a user interface (e.g., a web page) provided by the monitoring server 560 that enables a user to configure testing, provide input data to the central system, view images captured by the camera 530 and/or test reports and visualization maps related to the testing and, more generally, to the security system.

In some implementations, the one or more user devices 540, 550 communicate with and receive security system data from the control unit 510 using the communication link 538. For instance, the one or more user devices 540, 550 may communicate with the control unit 510 using various local wireless protocols such as Wi-Fi, Bluetooth, Zwave, ZigBee, HomePlug (Ethernet over powerline), or wired protocols such as Ethernet and USB, to connect the one or more user devices 540, 550 to local security and automation equipment. The one or more user devices 540, 550 may connect locally to the security system and its sensors and other devices. The local connection may improve the speed of status and control communications because communicating through the network 505 with a remote server (e.g., the monitoring server 560) can be significantly slower.

Although the one or more user devices 540, 550 are shown as communicating with the control unit 510, the one or more user devices 540, 550 may communicate directly with the sensors 520 and other devices controlled by the control unit 510. In some implementations, the one or more user devices 540, 550 replace the control unit 510 and perform the functions of the control unit 510 for local monitoring and long range/offsite communication.

In other implementations, the one or more user devices 540, 550 receive security system data captured by the control unit 510 through the network 505. The one or more user devices 540, 550 may receive the data from the control unit 510 through the network 505 or the monitoring server 560 may relay data received from the control unit 510 to the one or more user devices 540, 550 through the network 505. In this regard, the monitoring server 560 may facilitate communication between the one or more user devices 540, 550 and the security system.

In some implementations, the one or more user devices 540, 550 can be configured to switch whether the one or more user devices 540, 550 communicate with the control unit 510 directly (e.g., through link 538) or through the monitoring server 560 (e.g., through network 505) based on a location of the one or more user devices 540, 550. For instance, when the one or more user devices 540, 550 are located close to the control unit 510 and in range to communicate directly with the control unit 510, the one or more user devices 540, 550 use direct communication. When the one or more user devices 540, 550 are located far from the control unit 510 and not in range to communicate directly with the control unit 510, the one or more user devices 540, 550 use communication through the monitoring server 560.

In some implementations, the one or more user devices 540, 550 are used in conjunction with local sensors and/or local devices in a house. In these implementations, the system 500 includes the one or more user devices 540, 550, the sensors 520, the automation module 522, and the camera 530. The one or more user devices 540, 550 receive data directly from the sensors 520, the automation module 522, and the camera 530, and send data directly to the sensors 520, the automation module 522, and the camera 530. The one or more user devices 540, 550 provide the appropriate interfaces/processing to provide visual surveillance and reporting. In some implementations, the system 500 provides end users with access to images captured by the camera 530 to aid in decision making. The system 500 may transmit the images captured by the camera 530 over a wireless WAN network to the user devices 540, 550.

In some implementations, a state of the security system and other events sensed by the security system can be used to enable/disable video/image recording devices (e.g., the camera 530) and testing. In these implementations, the camera 530 can be set to capture images on a periodic basis when the alarm system is armed in an "Away" state, but set not to capture images when the alarm system is armed in a "Stay" state or disarmed. In addition, the camera 530 can be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images can be stored or transmitted over a network when needed.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    receiving, from a portable mapping device, coordinate data indicative of a geographical location of the portable mapping device, a physical sign being attached to the portable mapping device;
    identifying a camera configured to obtain images in a geographical area that includes the geographical location;
    transmitting a query message to the camera to query whether the camera has obtained an image that depicts the physical sign;
    receiving, from the camera, a first query response message comprising first data indicating whether the camera has obtained an image that depicts the physical sign;
    determining, in response to the first query response message, that the camera has not obtained an image that depicts the physical sign at a first orientation with respect to the portable mapping device;
    in response to determining that the camera has not obtained an image that depicts the physical sign at the first orientation with respect to the portable mapping device:
        transmitting, to the portable mapping device, a reconfiguration message that includes instructions to rotate the physical sign to a different orientation than the first orientation with respect to the portable mapping device;
        transmitting a second query message to the camera to query whether the camera has obtained an image that depicts the physical sign at the different orientation; and
        receiving, from the camera, a second query response message comprising second data indicating whether the camera has obtained an image that depicts the physical sign at the different orientation; and
    generating a camera coverage map that indicates locations within the geographical location that the camera provides camera coverage for, the camera coverage map being generated in response to the data indicating whether the camera has obtained an image that includes the physical sign.

2. The computer-implemented method of claim 1, comprising:
    transmitting location information to the portable mapping device to move to the geographical location; and
    upon receiving the first query response message, transmitting second location information to the portable mapping device and instructions for the portable mapping device to move to a second location,
    wherein receiving the coordinate data indicative of the geographical location of the portable mapping device comprises receiving a confirmation message that the portable mapping device has moved to the geographical location indicated by the location information.

3. The computer-implemented method of claim 1, wherein:
    the camera is one of a network of cameras configured to obtain image data for the geographical area;
    the portable mapping device comprises a drone;
    the physical sign comprises a pattern; and
    the data indicating whether the camera has obtained an image that depicts the physical sign comprises data indicating whether the camera has obtained an image of the pattern attached to the drone.

4. The computer-implemented method of claim 1, comprising:
    determining, in response to the first query response message, that the camera has not obtained an image that depicts the physical sign at a first orientation with respect to the portable mapping device;
    transmitting, to the portable mapping device, a reconfiguration message that includes instructions to move the physical sign to a second position of attachment to the portable mapping device;
    transmitting a second query message to the camera to query whether the camera has obtained an image that includes the physical sign at the second position of attachment to the portable mapping device; and
    receiving, from the camera, a second query response message comprising data indicating whether the camera has obtained an image that includes the physical sign at the second position of attachment to the portable mapping device.

5. The computer-implemented method of claim 1, wherein generating the camera coverage map comprises:
    providing data for configuring display of one or more visually-distinguishable indicators for display along with the camera coverage map, and
    wherein the one or more visually-distinguishable indicators comprises:
        a first indicator indicating that images of the physical sign are obtained by the camera;
        a second indicator indicating that images of the physical sign are obtained by the camera at less than all orientations or less than all positions of the physical sign attached to the portable mapping device;

a third indicator indicating that images of the physical sign cannot be obtained by the camera at the geographical location of the portable mapping device;

a fourth indicator indicating that images of the physical sign are obtained by a second camera;

a fifth indicator indicating that images of the physical sign are obtained by the second camera at less than all orientations or less than all positions of the physical sign attached to the portable mapping device; and a sixth indicator indicating that images of the physical sign cannot be obtained by the second camera at the geographical location of the portable mapping device.

6. The computer-implemented method of claim 1, comprising:

determining a movement path within the geographical area for the portable mapping device;

identifying locations on the movement path at which the camera is to obtain images; and transmitting, to the portable mapping device, data indicative of the locations on the movement path and instructions for the portable mapping device to move to the locations on the movement path in a sequential order.

7. A system comprising:

a network of cameras configured to obtain images in a geographical area; and a processor configured to:

receive, from a portable mapping device, coordinate data indicative of a geographical location of the portable mapping device, a physical sign being attached to the portable mapping device;

identify, from among the network of cameras, a camera configured to obtain images in a geographical area that includes the geographical location;

transmit a query message to the camera to query whether the camera has obtained an image that depicts the physical sign;

receive, from the camera, a first query response message comprising first data indicating whether the camera has obtained an image that depicts the physical sign;

determine, in response to the first query response message, that the camera has not obtained an image that depicts the physical sign at a first orientation with respect to the portable mapping device;

in response to determining that the camera has not obtained an image that depicts the physical sign at the first orientation with respect to the portable mapping device:

transmit, to the portable mapping device, a reconfiguration message that includes instructions to rotate the physical sign to a different orientation than the first orientation with respect to the portable mapping device;

transmit a second query message to the camera to query whether the camera has obtained an image that depicts the physical sign at the different orientation; and receive, from the camera, a second query response message comprising second data indicating whether the camera has obtained an image that depicts the physical sign at the different orientation; and generate a camera coverage map that indicates locations within the geographical location that the camera provides camera coverage for, the camera coverage map being generated in response to the data indicating whether the camera has obtained an image that includes the physical sign.

8. The system of claim 7, wherein:

the portable mapping device comprises a drone;

the physical sign comprises a pattern; and the data indicating whether the camera has obtained an image that includes the physical sign comprises data indicating whether the camera has obtained an image of the pattern attached to the drone.

9. The system of claim 7, wherein to generate the camera coverage map, the processor is configured to:

provide data for configuring display of one or more visually-distinguishable indicators for display along with the camera coverage map, and wherein the one or more visually-distinguishable indicators comprises:

a first indicator indicating that images of the physical sign are obtained by the camera;

a second indicator indicating that images of the physical sign are obtained by the camera at less than all orientations or less than all positions of the physical sign attached to the portable mapping device;

a third indicator indicating that images of the physical sign cannot be obtained by the camera at the geographical location of the portable mapping device;

a fourth indicator indicating that images of the physical sign are obtained by a second camera;

a fifth indicator indicating that images of the physical sign are obtained by the second camera at less than all orientations or less than all positions of the physical sign attached to the portable mapping device; and a sixth indicator indicating that images of the physical sign cannot be obtained by the second camera at the geographical location of the portable mapping device.

10. A non-transitory computer-readable storage medium including instructions that, when executed by a processor, cause the processor to perform operations comprising:

receiving, from a portable mapping device, coordinate data indicative of a geographical location of the portable mapping device, a physical sign being attached to the portable mapping device;

identifying a camera configured to obtain images in a geographical area that includes the geographical location;

transmitting a query message to the camera to query whether the camera has obtained an image that depicts the physical sign;

receiving, from the camera, a first query response message comprising first data indicating whether the camera has obtained an image that depicts the physical sign;

determining, in response to the first query response message, that the camera has not obtained an image that depicts the physical sign at a first orientation with respect to the portable mapping device;

in response to determining that the camera has not obtained an image that depicts the physical sign at the first orientation with respect to the portable mapping device:

transmitting, to the portable mapping device, a reconfiguration message that includes instructions to rotate the physical sign to a different orientation than the first orientation with respect to the portable mapping device;

transmitting a second query message to the camera to query whether the camera has obtained an image that depicts the physical sign at the different orientation; and receiving, from the camera, a second query response message comprising second data indicating whether the camera has obtained an image that depicts the physical sign at the different orientation; and generating a camera coverage map that indicates locations within the geographical location that the camera provides camera coverage for, the camera coverage map being generated in response to the data indicating whether the camera has obtained an image that includes the physical sign.

11. The non-transitory computer-readable storage medium of claim 10, wherein:

the camera is one of a network of cameras configured to obtain image data for the geographical area;

the portable mapping device comprises a drone;

the physical sign comprises a pattern; and the data indicating whether the camera has obtained an image that includes the physical sign comprises data indicating whether the camera has obtained an image of the pattern attached to the drone.

* * * * *